United States Patent Office 3,274,671
Patented Sept. 27, 1966

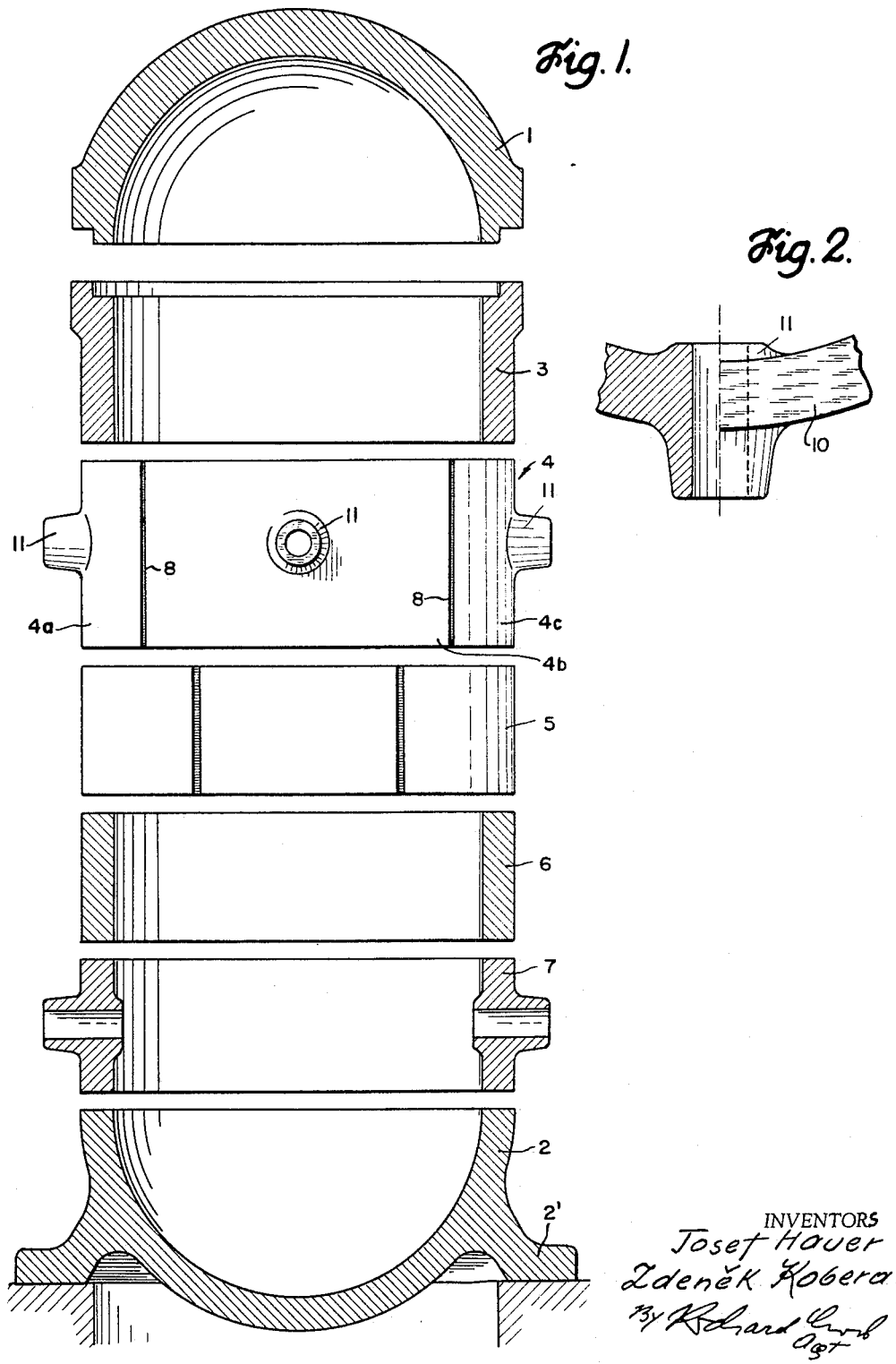

3,274,671
METHOD OF PRODUCING A PROJECTION ON A MACHINE COMPONENT
Josef Hauer, Radcice u Plzne, and Zdeněk Kobera, Plzen, Czechoslovakia, assignors to Zavody V.I. Lenina Plzen, narodni podnik, Plzen, Czechoslovakia
Filed Aug. 4, 1965, Ser. No. 479,048
Claims priority, application Czechoslovakia, Aug. 29, 1962, 4,980/62
6 Claims. (Cl. 29—157)

This application is a continuation-in-part of our co-pending application Serial No. 298,307, filed on July 29, 1963, now abandoned.

This invention relates to a method of producing projections on forged, pressed or rolled machine components, having a major portion of substantially uniform thickness, and at least one minor integral portion larger in the direction of said thickness and projecting from the surface of said major portion. A more particular object of the invention is the production of tubulations, connectors, and the like on pressure vessels having a wall thickness exceeding 100 mm.

Machine components or parts of large dimensions with projections, and particularly thick-walled and large sections of pressure vessels with inlet and outlet tubulations could not heretofore be produced by forging or pressing or bending or rolling from a single piece of material. Such spacious pressure vessels have been made from forged and pressed or bent spherical caps and rings welded together in accordance with their size from individual segments.

Various projections and branches, including connectors, tubulations, and the like have hitherto been provided on thick-walled machine parts, more particularly high pressure vessels, by boring holes into the envelope of the vessel, and by inserting branch tubes or other projections, which were prepared separately, into the holes, and then welding the projections to the envelope.

This known method has the serious drawback that mechanical stress are concentrated at the weld. There is danger of cracks occurring in the material of the envelope while the branch tube is being welded thereto, and local stresses may remain after welding and thermal treatment. These factors affect unfavorably the mechanical strength of the material and reduce its resistance to brittle failure and fatigue.

Several methods have already been proposed for overcoming these difficulties in machine components and vessels having relatively thin walls. The more difficult problem of making reliable projections and branches on thick-walled machine components, and more particular on thick-walled vessels, has not been attacked successfully prior to this invention.

One of the objects of this invention is to provide projections and connectors on forged and rolled machine components of otherwise substantially uniform thickness, and particularly connectors on walls of pressure vessels thicker than 100 mm. without making a welded joint between the projection and the wall of the machine part or pressure vessel.

In accordance with one of the main features of the invention, a unitary piece of metal is forged, stamped, or rolled to an initial thickness corresponding to the total height of a projection or connector that it is desired to produce. The wall thickness of a major annular part of the pre-shaped machine component or vessel is then reduced by selectively applying thereto pressure in the direction of its thickness, as by forging or pressing until the annular faces of the major part are displaced toward each other to produce a shape whose center is occupied by the projection or connector and whose periphery has substantially uniform wall thickness. The initial thickness of the central portion of the pre-shaped component remains substantially unchanged during the forging or pressing operation. A single piece of material forms a complete section of the vessel, or at least a piece of such size that it may be assembled by welded joints located where there are no complicated or concentrated stresses.

The invention will be best understood from the following description of the accompanying drawing which illustrates machinery made according to a preferred embodiment of the invention. In the drawing:

FIG. 1 is an exploded elevational view, partly in section, of a large metallic pressure vessel having a wall thickness of more than 100 mm. and assembled from several sections of such size as can be produced from available ingots of suitable quality, and FIG. 2 illustrates a detail of the vessel of FIG. 1 partly in plan view and partly in plan section and on a larger scale.

Referring now to the drawing in detail, and initially to FIG. 1, there are shown the several sections 1 to 7 of a pressure vessel having the overall shape of an upright hollow cylinder whose axial ends are closed by generally hemispherical caps 1 and 2, the latter having an integral mounting flange 2'. Among the annular sections 3 to 7, section 4 will be described in more detail.

As far as visible in the drawing, it consists of three circumferential parts 4a, 4b, and 4c. As better seen in FIG. 2, each part has a cylindrically curved wall portion 10 which is of substantially uniform thickness, and an integral tubulation 11 centered in the wall portion and projecting therefrom both toward the axis of the vessel and in an outward direction. The several wall portions 10 are connected by straight axial welds well spaced from the projections 11. In the part 4b, the spacing is at least twice the maximum dimension of the tubulation 11 in a direction perpendicular to the thickness of the portion 10, which is greater than 100 millimeters.

In accordance with the invention the tubulation 11 is not produced separately and then welded to a section of the vessel. Consequently, there are no unfavorable effects from a weld at the tubulation on the strength of the vessel. The parts 4a, 4b, 4c of section 4 are each made from a forging or rolled piece whose initial thickness corresponds to the overall height of the tubulation 11. The thickness of this piece is selectively reduced by forging or it is otherwise stretched until a major annular part thereof has the thickness of the wall portion 10, whereupon the projection remaining in the center is pierced and machined to give it its final shape. FIG. 1 shows that the connecting welds 8 are approximately as far from the tubulations 11 of the vessel as the welds, not shown, which connect the several sections 1 to 7 in the fully assembled vessel.

The method of forming integral projections on heavy wall sections according to this invention is useful for several industries, such as the chemical industry, which require pressure vessels of high quality that are safe and have a long service life.

What is claimed is:

1. A method of producing a unitary machine element having a wall portion of substantially uniform thickness and a projecting portion integral with said wall portion, the dimension of said projecting portion in the direction of said thickness being substantially greater than said thickness, which method comprises:

(a) forming a unitary piece of material to an initial thickness substantially equal to said dimension, said piece having a minor central portion and a major peripheral portion extending from said central portion transversely of the thickness of said piece in all directions;

(b) selectively applying pressure to said peripheral portion in the direction of said thickness of said piece until the thickness of said peripheral portion is reduced to said substantially uniform thickness while retaining said central portion at said initial thickness.
  (1) said peripheral portion of reduced thickness constituting said wall portion, and said central portion of initial thickness constituting said projecting portion, and
(c) piercing said central portion to form a passage therethrough in the direction of said dimension.

2. A method of producing a unitary machine element which comprises:
  (a) forming a unitary piece of material to an initial thickness, said piece having two opposite faces spaced from each other by said thickness, said faces having respective minor central portions aligned in the direction of said thickness, and respective major annular peripheral portions contiguously extending about said central portions; and
  (b) selectively applying pressure to said major face portions in the direction of said thickness until said major portions are displaced relative to each other to define therebetween an annular wall portion of substantially uniform thickness smaller than said initial thickness but greater than 100 millimeters, while maintaining the spacing of said central portions substantially unchanged and equal to said initial thickness.

3. A method of producing a unitary machine element which comprises:
  (a) forming a unitary piece of metallic material to an initial thickness, said piece having two opposite faces spaced from each other by said thickness, said faces having respective minor central portions aligned in the direction of said thickness, and respective major annular peripheral portions contiguously extending about the respective central portions; and
  (b) selectively applying pressure to said major face portions in the direction of said thickness until each of said major face portions is displaced toward the other major face portion relative to the initial positions of said opposite faces to define with said other face portion an annular wall portion of substantially uniform thickness greater than 100 millimeters and smaller than said initial thickness, while maintaining said central face portions in said initial position.

4. In a method of making a metallic pressure vessel having a finished wall thickness greater than 100 millimeters and having a projecting portion in the wall thereof, the overall dimension of said projecting portion in the direction of said thickness being substantially greater than the thickness of said wall, in combination:
  (a) forming a wall section;
  (b) forming a unitary piece of metal to an initial thickness substantially greater than said finished wall thickness, said piece having two opposite faces spaced from each other by said initial thickness, said faces having respective minor central portions aligned in the direction of said thickness, and respective major, annular, peripheral portions contiguous to said central portions and extending from said central portions in all directions transverse of said thickness of said piece;
  (c) selectively applying pressure to said major face portions in the direction of thickness of said piece until said major face portions are displaced relative to each other to define therebetween an annular wall portion of a thickness substantially equal to said finished wall thickness, while maintaining the spacing of said central portions substantially equal to said initial thickness, whereby minor face portions define therebetween a projecting portion, said annular wall portion having a rim part remote from said projection; and
  (d) joining said rim part to said wall section.

5. In a method as set forth in claim 4, the thickness of said annular wall portion being substantially uniform.

6. In a method as set forth in claim 4, the spacing of said rim part from said projection being substantially greater than any dimension of said projection transversely of said spacing of said minor face portions, and said rim part being joined to said wall section by welding.

References Cited by the Examiner

UNITED STATES PATENTS 2,250,542  7/1941  Lodge _____ 72—185

FOREIGN PATENTS 170,580  7/1922  Great Britain.

CHARLIE T. MOON, *Primary Examiner.*